United States Patent
Sorita et al.

(10) Patent No.: US 7,926,273 B2
(45) Date of Patent: Apr. 19, 2011

(54) WASTE HEAT POWER GENERATION SYSTEM OF CEMENT CALCINATION PLANT

(75) Inventors: Katsushi Sorita, Sakura (JP); Tatsuo Ino, Tomisato (JP); Yukihiro Takenaka, Sakura (JP); Masao Shirai, Katsushika-ku (JP)

(73) Assignee: Kawasaki Plant Systems Kabushiki Kaisha, Kobe-shi (JP)

( * ) Notice: Subject to any disclaimer, the term of this patent is extended or adjusted under 35 U.S.C. 154(b) by 423 days.

(21) Appl. No.: 11/991,855

(22) PCT Filed: Sep. 18, 2007

(86) PCT No.: PCT/JP2007/068043
§ 371 (c)(1),
(2), (4) Date: Mar. 12, 2008

(87) PCT Pub. No.: WO2008/078436
PCT Pub. Date: Jul. 3, 2008

(65) Prior Publication Data
US 2010/0146972 A1    Jun. 17, 2010

(30) Foreign Application Priority Data
Dec. 26, 2006 (JP) .................. 2006-349606

(51) Int. Cl.
*F02G 3/00* (2006.01)
*F01K 23/10* (2006.01)
*F01K 23/06* (2006.01)

(52) U.S. Cl. .................. 60/670; 60/616; 60/618
(58) Field of Classification Search ........ 60/614–624, 60/645, 651, 653, 670, 671, 677
See application file for complete search history.

(56) References Cited

U.S. PATENT DOCUMENTS

| 2,957,815 | A | * | 10/1960 | Tillequin et al. | 376/391 |
| 5,386,685 | A | * | 2/1995 | Frutschi | 60/783 |
| 5,839,269 | A | * | 11/1998 | Frutschi | 60/783 |

FOREIGN PATENT DOCUMENTS

| JP | 58-049801 | * | 3/1983 |
| JP | A 58-49801 |   | 3/1983 |
| JP | 58-057013 | * | 4/1983 |
| JP | A 58-57013 |   | 4/1983 |
| JP | U 62-180607 |   | 11/1987 |
| JP | A 63-263206 |   | 10/1988 |
| JP | A 6-42703 |   | 2/1994 |

* cited by examiner

*Primary Examiner* — Thomas E Denion
*Assistant Examiner* — Christopher Jetton
(74) *Attorney, Agent, or Firm* — Oliff & Berridge, PLC

(57) ABSTRACT

A waste heat power generation system of a cement calcination plant includes: an AQC boiler having an economizer, an evaporator and a superheater; and a PH boiler having a first evaporator and a superheater. The PH boiler, in addition to the evaporator and the superheater, has a second evaporator on a PH exhaust gas exit side, and a returned hot water from a flasher is introduced into the second evaporator via a steam drum. A hot water heated by the second evaporator is introduced into the steam drum, and a steam from the steam drum is introduced into the low-pressure stage of the steam turbine.

2 Claims, 2 Drawing Sheets

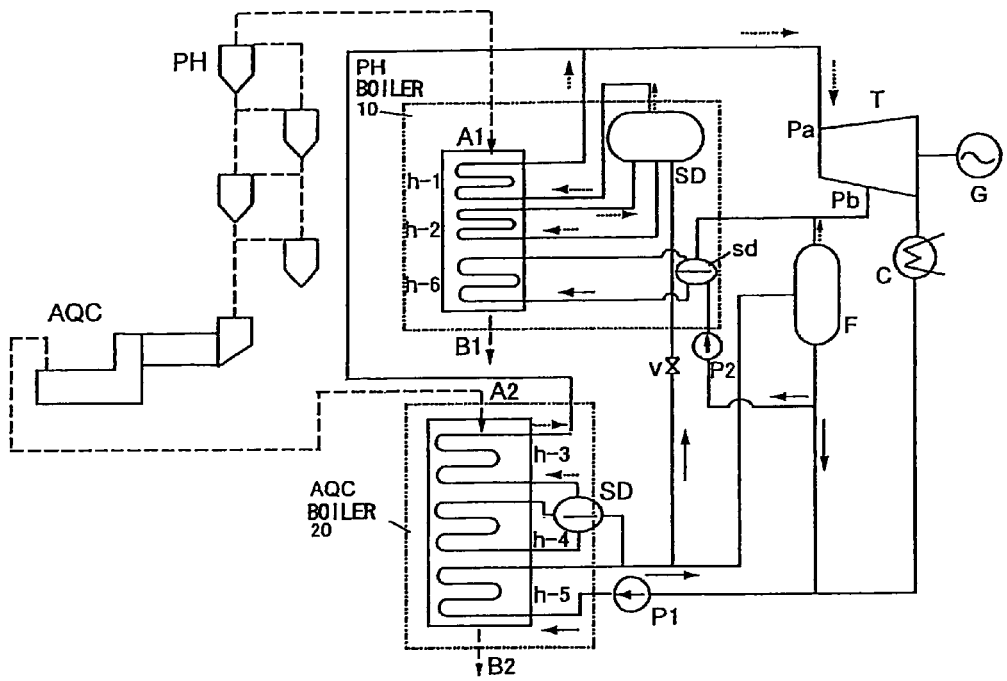
F I G. 1
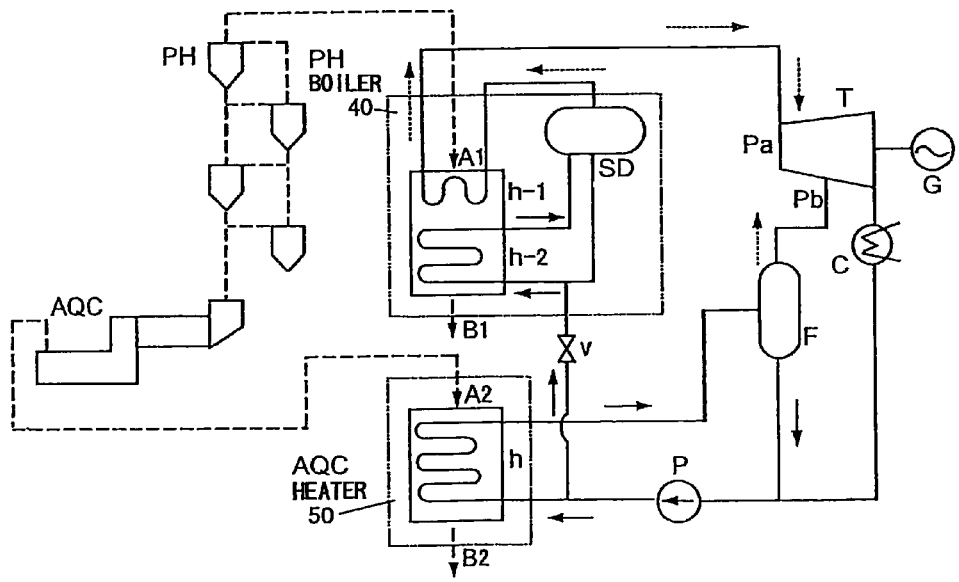
F I G. 2

1

WASTE HEAT POWER GENERATION SYSTEM OF CEMENT CALCINATION PLANT

CROSS REFERENCE TO RELATED APPLICATIONS

This application is based upon and claims the benefit of priority from the prior Japanese Patent Application No. 2006-349606 filed on Dec. 26, 2006, the entire contents of which are incorporated herein by reference.

TECHNICAL FIELD

The present invention relates to a power generation system using waste heat of a cement calcination plant for increasing the waste heat recovery rate of an air quenching cooler (AQC) as much as possible, increasing the waste heat recovery rate of a suspension preheater (PH), thereby increasing the total power generation due to waste heat.

BACKGROUND ART

In a cement calcination plant, a large amount of waste heat of a suspension preheater (hereinafter, may be referred to as just a preheater or a PH) and waste heat of an air quenching cooler (hereinafter, may be referred to as just a quenching cooler or AQC) is discharged, so that a waste heat boiler generates steam by using the waste heat so as to drive a steam turbine by the steam, thereby generates power.

On the other hand, in the cement calcination plant, there are two waster heat sources, namely, the preheater and air quenching cooler. The waste gas temperature and waste heat quantity are greatly different between the two heat sources and vary with the operation condition of the plant, so that the heat quantity supply due to both waste heats is not always stable.

The waste gas temperature of the preheater (PH) is, for example, 350 to 400° C., and the waste gas temperature of the air quenching cooler (AQC) is almost 300 to 250° C. A conventional waste heat power generation system for generating high-pressure steam has been operated so far, so as to generate high pressure steam by the boilers using the waste heat, that is, a PH boiler and an AQC boiler. The exit gas temperature of the PH boiler is set at 250° C. or so, so that the cement raw materials are dried using the heat. On the other hand, the AQC waste heat is collected by the AQC boiler to its limit, thereby generating electric power.

[Related Art 1]

The embodiment of the waste heat power generation system aforementioned varies with the productivity and the way of using the residual heat of a cement calcination plant to which the embodiment is applied. There is a waste heat power generation system (Related Art 1) that the steam turbine is used as a multi-staged mixed pressure turbine, and high-pressure steam is generated by the PH boiler and is introduced into the high-pressure stage of the steam turbine. On the other hand, low-pressure steam is generated by hot water of the AQC heater and is introduced into the low-pressure stage of the steam turbine. Thus the steam turbine is driven (FIG. 4 of JP-A 58-57013). The outline thereof is as shown in FIG. 2. The waste heat power generation system heats condensate of a condenser C by an economizer h of an AQC heater 50, introduces low-pressure steam generated by a flasher F into a low-pressure stage Pb of a steam turbine T. On the other hand, this system heats condensate of the condenser C by an evaporator h-2 of a PH boiler 40, superheats it by a superheater h-1, and introduces the same into a high-pressure stage Pa of the steam turbine T. The steam pressure of low-pressure steam by the AQC heater 50 of this waste heat power generation system is about 3 atg, and the temperature of exit gas B2 of the heater is about 100° C. The steam pressure of high-pressure steam by the PH heater 40 is about 16 atg, and the temperature of exit gas B1 of the boiler is about 230° C.

[Related Art 2]

As an embodiment of the waste heat power generation system for increasing the waste heat recovery rate of the air quenching cooler (AQC), there is a waste heat power generation system (Related Art 2) that a part of hot water heated by the economizer h of the AQC heater 50 is introduced into the flasher F to form low-pressure steam, and it is introduced into the low-pressure stage Pb of the steam turbine T. And, another one part of the aforementioned hot water is superheated by the PH boiler, and it is introduced into the high-pressure stage Pa of the steam turbine T (FIG. 3 of JP-A 58-49801).

The outline of the system of Related Art 2 is as shown in FIG. 3. This system of Related Art 2 heats condensate of the condenser C by the economizer h of the AQC heater 50, introduces a part of the hot water into the flasher F, and introduces the low-pressure steam into the low-pressure stage Pb of the steam turbine T. On the other hand, this system heats another one part of the hot water by the evaporator h-2 of the PH boiler, furthermore superheats it by the superheater h-1, and introduces the same into the high-pressure stage Pa of the steam turbine T.

The steam pressure of low-pressure steam by the AQC heater 50 is about 3 atg, and the temperature of exit gas B2 of the heater is about 100° C. The steam pressure of high-pressure steam by the PH heater 40 is about 16 atg, and the temperature of exit gas B1 of the boiler is about 230° C.

[Related Art 3]

Furthermore, Related Art 3 is a waste heat power generation system for increasing the waste heat recovery rate of Related Art 2 aforementioned as much as possible by adopting AQC boiler instead of AQC heater, and lowering the temperature of exit gas of the AQC boiler.

The outline thereof is as shown in FIG. 4. The waste heat power generation system is equipped with an economizer h-5, an evaporator h-4, and a superheater h-3 in an AQC boiler 50A. A part of hot water by the economizer h-5 of the AQC boiler 50A is introduced into the flasher F, and the low-pressure steam thereof is introduced into the low-pressure stage Pb of the steam turbine T. On the other hand, another one part of the hot water is introduced into the evaporator h-4 of the AQC boiler 50A, furthermore it is superheated by the superheater h-3, and the high-pressure steam is introduced into the high-pressure stage Pa of the steam turbine T. Further, still another one part of the aforementioned hot water is introduced into an evaporator h-2 of the PH boiler 40 via a valve v and an evaporator SD, then it is superheated by a superheater h-1, and the high-pressure steam is introduced into the high-pressure stage Pa of the steam turbine T.

In the economizer h-5 of the AQC boiler 50A of Related Art 3, in addition to the AQC boiler and PH boiler, by exchanging the heat of hot water for flasher, the temperature of exit gas of the AQC boiler 50A is lowered to about 100° C., so that the AQC waste heat is recovered sufficiently.

On the other hand, the high-pressure steam, which has been heated by the evaporator h-2 of the PH boiler 40 and furthermore superheated by the superheater h-1, is controlled at about 16 to 17 atg and the temperature of the exit gas B1 of the PH boiler in this case is lowered to about 230 to 200° C. And, the high-temperature exhaust gas is additionally used to dry cement raw materials.

In the cement calcination plant, in correspondence with a sudden rise of energy expenses, the power expenses rise suddenly, so that it is requested to recover this waste heat as power as much as possible. Therefore, to further increase the power generation, there is a possibility that it may be necessary to lower the temperature of exit gas of the PH boiler to about 160° C., and for that purpose, it may be considered to form a multi-pressure PH boiler.

On the other hand, in Related Art 3 aforementioned, it is important to increase the waste heat recovery rate of the preheater (PH) and air quenching cooler (AQC), so that it is important to realize a multi-pressure PH boiler, lower the exit gas temperature, increase the PH waste heat recovery rate, and maintain the waste heat recovery rate of AQC exhaust gas on a high level.

DISCLOSURE OF THE INVENTION

The present invention is related to a waste heat power generation system of a cement calcination plant including: an AQC boiler having an economizer, an evaporator, and a superheater; and a PH boiler having an evaporator and a superheater, in which a part of hot water heated by the economizer of the AQC boiler is introduced into a low-pressure stage of a steam turbine via a flasher, another one part of the hot water is superheated by the evaporator and superheater of the AQC boiler, and still another one part of the hot water is superheated by the evaporator and superheater of the PH boiler, so as to introduce the high-pressure steam into a high-pressure stage of the steam turbine. The object of the present invention is, when reforming the PH boiler to a two-pressure boiler, to devise a constitution of the cement waste heat power generation system so as to maintain the exit gas temperature of the AQC boiler at a low temperature as much as possible, and lower the exit gas temperature of the PH boiler as much as possible, thereby increase greatly the waste heat recovery rate.

The present invention for achieving the aforementioned object includes the following basic constitution (A), and the following characteristic features (i) and (ii).

(A) The waste heat power generation system of a cement calcination plant has a constitution that the AQC boiler has an economizer, an evaporator, and a superheater, and the PH boiler has a first evaporator and a superheater, and a part of hot water heated by the economizer of the AQC boiler is introduced into the low-pressure stage of the steam turbine via the flasher, and another one part of the hot water is superheated by the evaporator and superheater of the AQC boiler, and still another one part of the hot water is superheated by the evaporator and superheater of the PH boiler, so as to introduce the high-pressure steam into the high-pressure stage of the steam turbine.

(i) The PH boiler, in addition to the evaporator and superheater aforementioned, has a second evaporator on the PH exhaust gas exit side, and a returned hot water from the flasher is introduced into the second evaporator via a steam drum.

(ii) The hot water heated by the second evaporator is introduced into the steam drum, and the steam from the steam drum is introduced into the low-pressure stage of the steam turbine.

The AQC boiler of the present invention has the economizer, evaporator, and superheater, and the PH boiler has the evaporator and superheater, and a part of hot water heated by the economizer of the AQC boiler is introduced into the low-pressure stage of the steam turbine via the flasher. In this regard, the present invention is similar to Related Art 3, thus the AQC waste heat recovery rate is maintained at a high level similarly to Related Art 3.

On the other hand, the PH boiler has the second evaporator on the exhaust gas exit side of the PH boiler, and a returned hot water of the flasher of the low-pressure system of the AQC boiler is introduced into the second evaporator. Accordingly, a large amount of low-pressure steam introduced into the low-pressure stage of the steam turbine is generated. And, the large amount of low-pressure steam is introduced into the low-pressure stage of the turbine, so that the PH waste heat recovery rate is increased greatly.

In the PH boiler of Related Art 3, it is preferable for the constitution of the power generation system to increase the steam pressure thereof to about 7 atg. In this case, the exit gas temperature of the PH boiler is 200° C. at its maximum. On the other hand, according to the present invention, when the low-pressure system of the second evaporator and steam drum is set at about 3 atg (a saturation temperature of 142.9° C.), the steam pressure of the high-pressure system of the first evaporator and superheater can be raised at least up to 16 atg and the exit gas temperature of the PH boiler in this case can be lowered to around 160° C. Therefore, PH waste heat by the PH boiler is recovered up to substantially its limit.

Therefore, as mentioned above, by maintaining the AQC waste heat recovery rate at a high level, the PH waste heat recovery rate can be improved greatly.

In this connection, as an example, when the power generation system of the present invention is applied to a cement calcination waste heat power generation system by Related Art 3 having the power generation output of 23400 kW, the power generation output becomes at least 25500 kW.

Therefore, the waste heat recovery rate of a cement calcination plant is improved and the waste heat power generation output can be increased greatly.

BRIEF DESCRIPTION OF THE DRAWINGS

FIG. 1 is a diagram showing schematically the entire structure of the embodiment of the present invention.

FIG. 2 is a diagram showing schematically the entire structure of the related art (Related Art 1) of the waste heat power generation system of a cement calcination plant.

BEST MODE FOR CARRYING OUT THE INVENTION

Next, an embodiment of the present invention will be explained with reference to FIG. 1.

This embodiment is an example that the present invention is applied to a waste heat power generation system of 2 production lines of a cement calcination plant having a production capacity of 10000 t/day, and the general constitution thereof is not particularly different from Related Art 3 aforementioned. The temperature of exhaust gas A1 of the suspension preheater (PH) is 165° C., and the temperature of exhaust gas A2 of the air quenching cooler (AQC) is 105° C.

Figure 3:
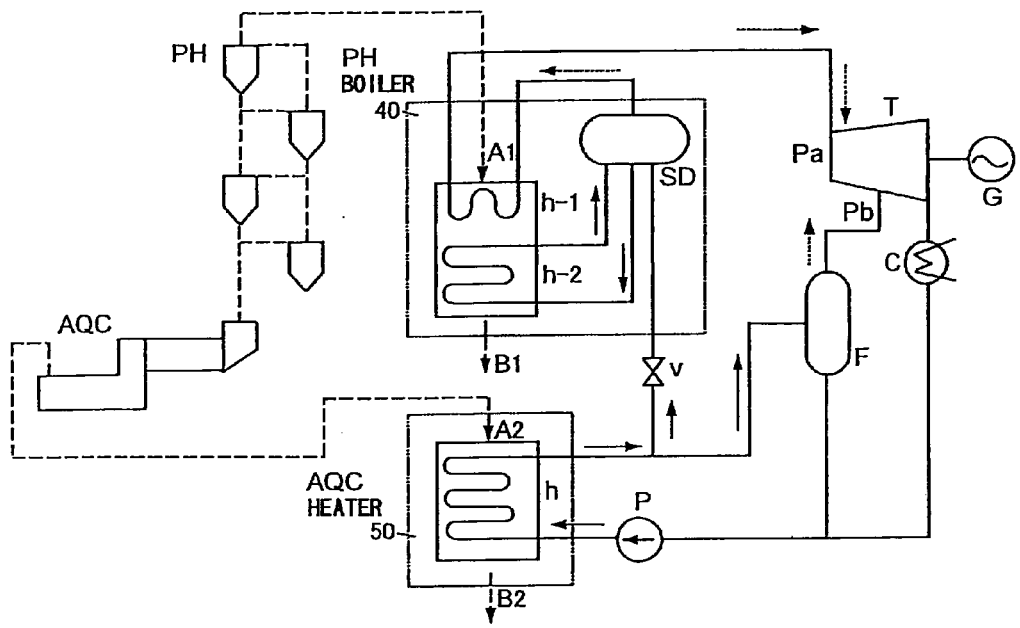
FIG. 3 is a diagram showing schematically the entire structure of another related art (Related Art 2) of the waste heat power generation system of a cement calcination plant.
Figure 4:
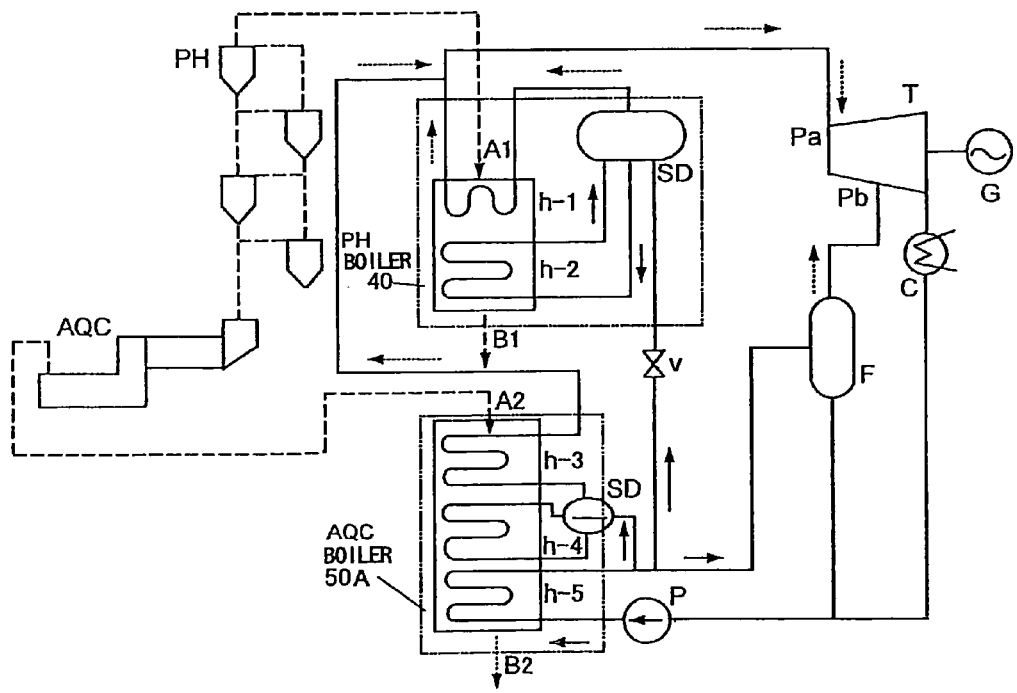
FIG. 4 is a diagram showing schematically the entire structure of still another related art (Related Art 3) of the waste heat power generation system of a cement calcination plant.

A PH boiler 10, similarly to Related Art 3 (FIG. 4), has a first evaporator h-2 and a superheater h-1. In addition to them, the PH boiler 10 of this embodiment has a second evaporator h-6 on the exhaust gas exit side thereof.

On the other hand, an AQC boiler 20 is similar to the AQC boiler 50 of Related Art 3 and has a superheater h-3, an evaporator h-4, and an economizer h-5.

The returned hot water of the flasher F and condensate of the condenser C are pressed into the economizer h-5 by a feed water pump P1. The temperature of hot water heated by the economizer h-5 is 200° C. A part the hot water is introduced into the flasher F so as to generate a low-pressure steam, and the low-pressure steam is introduced into the low-pressure stage Pb of the steam turbine. Another one part of the hot water is introduced into the evaporator h-4 of the AQC boiler. And still another one part of the hot water is introduced into a steam drum SD of the PH boiler 10. And, these are not different from those of Related Art 3.

In this embodiment, the water feed rate to the economizer h-5 by the feed water pump P1 is controlled at 260 t/hour in total. The flow rate of hot water introduced into the flasher F is controlled to 150 t/hour in total.

On the other hand, the PH boiler 10 has a second evaporator h-6 on the exit side of exhaust gas A1 thereof. The second evaporator is connected to a steam drum sd. The steam drum sd is connected to the low-pressure stage Pb of the steam turbine T. And, a part of the returned hot water of the flasher F is introduced into the steam drum sd by a feed water pump P2 and is heated by the second evaporator h-6, thus low-pressure steam is generated.

In this embodiment, the steam pressure by a superheater h-1 of the PH boiler 10 is controlled at about 16 atg, and the steam pressure of the second evaporator h-6 is controlled at about 3 atg. Further, the steam pressure by the superheater h-3 of the AQC boiler 20 is controlled at about 15 atg, and the low-pressure steam by the economizer h-5 of the AQC boiler 20 and the flasher is controlled at about 3 atg.

In the above operational status, the temperature 325° C. of entrance gas A1 of the PH boiler 10 is lowered to the temperature 165° C. of exit gas B1. Further, the temperature 360° C. of entrance gas A2 of the AQC boiler 20 is lowered to the temperature 105° C. of exit gas B2.

The power generation in the aforementioned operational status in this embodiment is almost 25500 kW, and it is about 1.1 times of the power generation in comparison to the Related Art 3.

COMPARATIVE EXAMPLE

In the waste heat power generation system of Related Art 3 aforementioned, in order to lower the exit gas temperature of the PH boiler as much as possible and increase the PH waste heat recovery rate by the PH boiler, similarly to the AQC boiler, it may be considered to install an economizer on the exhaust gas exit side of the PH boiler, supply condensate of the condenser to the same, and introduce hot water heated by the economizer to the evaporator h-2 (Comparative Example).

However, in the case of this comparative example, the PH boiler 40 of Related Art 3 has only one pressure system and is not different from Related Art 3, and although the PH waste heat recovery rate is increased, the water supply amount to the economizer h-5 of the AQC boiler 50A is decreased in comparison to Related Art 3, so that the AQC waste heat recovery rate is lowered. Therefore, in the case of this comparative example, the total waste heat recovery rate by both the AQC boiler and PH boiler is extremely lowered in comparison to the present invention. In other words, the power generation using waste heat of the cement calcination plant is greatly higher in the present invention than that of the comparative example.

Although the invention has been described in its preferred embodiment with a certain degree of particularity, obviously many changes and variations are possible thereon. It is therefore to be understood that the present invention can be practiced otherwise than as specifically described herein without departing from the scope and spirit thereof.

The invention claimed is:

1. A waste heat power generation system of a cement calcination plant comprising: an air quenching cooler boiler having an economizer, an evaporator and a superheater; and a preheater boiler having a first evaporator and a superheater, the system being structured so that a part of hot water heated by the economizer of the air quenching cooler boiler is introduced into a low-pressure stage of a steam turbine via a flasher, and another one part of the hot water is superheated by the evaporator and the superheater of the air quenching cooler boiler, and still another one part of the hot water is superheated by the evaporator and the superheater of the preheater boiler, so as to introduce a high-pressure steam into a high-pressure stage of the steam turbine, wherein:

the preheater boiler, in addition to the evaporator and the superheater, has a second evaporator on a preheater exhaust gas exit side, and returned hot water from the flasher is introduced into the second evaporator via a steam drum, and hot water heated by the second evaporator is introduced into the steam drum, and a steam from the steam drum is introduced into the low-pressure stage of the steam turbine.

2. The waste heat power generation system of a cement calcination plant according to claim 1, wherein a superheated steam pressure by the superheater of the preheater boiler is 13 atg or higher, and a steam pressure by the second evaporator and the steam drum is 3 atg or lower.

\* \* \* \* \*